United States Patent
Macleod et al.

(10) Patent No.: US 9,916,224 B2
(45) Date of Patent: Mar. 13, 2018

(54) INTEGRATING QUALITY ANALYSIS WITH A CODE REVIEW TOOL

(71) Applicant: LinkedIn Corporation, Mountain View, CA (US)

(72) Inventors: Andrew Macleod, Campbell, CA (US); Jasper Lee, Fremont, CA (US); Scott Holmes, Morgan Hill, CA (US); Arvind Mani, Los Altos, CA (US); Nikhil Marathe, Sunnyvale, CA (US); Yuji Kosuga, Sunnyvale, CA (US); Roman Shafigullin, Sunnyvale, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 144 days.

(21) Appl. No.: 14/854,888

(22) Filed: Sep. 15, 2015

(65) Prior Publication Data
US 2017/0075790 A1   Mar. 16, 2017

(51) Int. Cl.
G06F 11/36   (2006.01)

(52) U.S. Cl.
CPC ...... *G06F 11/3664* (2013.01); *G06F 11/3608* (2013.01); *G06F 11/3668* (2013.01)

(58) Field of Classification Search
CPC .............. G06F 11/3664; G06F 11/3608; G06F 11/3668
See application file for complete search history.

(56) References Cited

U.S. PATENT DOCUMENTS

| | | | |
|---|---|---|---|
| 7,778,866 B2 * | 8/2010 | Hughes | G06F 8/20 717/101 |
| 2003/0130021 A1 * | 7/2003 | Lydon | G06Q 10/06 463/9 |
| 2016/0004517 A1 * | 1/2016 | Safary | G06F 8/436 717/131 |
| 2016/0266896 A1 * | 9/2016 | Fan | G06F 11/36 |
| 2016/0291970 A1 * | 10/2016 | Mallisetty | G06F 8/71 |
| 2016/0378618 A1 * | 12/2016 | Cmielowski | G06F 11/3624 714/38.1 |
| 2017/0075790 A1 * | 3/2017 | Macleod | G06F 11/3664 |

OTHER PUBLICATIONS

Aditya Pratap Bhuyan, Code Review Principles Processess and Tools, Apr. 25, 2014, retrieved online on Jun. 26, 2017, pp. 1-25.*
Felix Raab, Collaborative Code Reviews on Interactive Surfaces, Aug. 2011, retrieved online on Jun. 26, 2017, pp. 263-264. Retrieved from the Internet: <URL: http://delivery.acm.org/10.1145/2080000/2074771/p263-raab.pdf?ip=151.207.250.51&id=2074771&acc=ACTIVE%20SERVICE&key=C15944E53D0ACA63%2E4D4702B0C3E38B35%2E4D4702B0C3E38B35%2E4D4702B0C3E38B35&CFID=>.*
Review Board, "Take the Pain Out of Code Review", https://web.archive.org/web/20150814121307/https://www.reviewboard.org/, last viewed on Feb. 1, 2016, 4 pages.

* cited by examiner

*Primary Examiner* — Hanh T Bui
(74) *Attorney, Agent, or Firm* — Hickman Palermo Becker Bingham LLP; Daniel D. Ledesma

(57) ABSTRACT

Techniques are provided for integrating source code analysis tools with a code review tool. A user submits a code change to the code review tool and one or more code analysis tools are automatically initiated to analyze the changed code. Results of the code analysis tool(s) are automatically provided back to the code review tool. Additionally or alternatively, one or more tests are automatically run to test one or more executables that are based on the changed code. Results of the test(s) are automatically provided to the code review tool. In this way, an effect of a code change is automatically determined and available for review along with the code change. The results of any code analysis tools and/or tests may be posted synchronously or asynchronously with the corresponding code change.

20 Claims, 8 Drawing Sheets

Kibitzer Output 2

========== Kibitzer Run # 1 ==========

This Kibitzer job is based off of diff # 1.

A wc-test has been kicked off with your changes: https://mp-trunkdev-hudson.corp.linkedin.com/job/MP_TRUNKDEV_POSTCOMMIT/88094?

Kibitzer code quality job kicked off with url: https://mp-trunkdev-hudson.corp.linkedin.com/job/KIBITZER_CODE_QUALITY/3239?

XSS test has finished running.

Style check has finished running.

Static analysis has finished running.

Package coverage decreased:
   linkedin.reviewboard.rbutils:   68% --> 51%
   TOTAL:   75% --> 63%

Coverage for modified source code: 0.00%

The wc-test failed.

INTEGRATING QUALITY ANALYSIS WITH A CODE REVIEW TOOL

TECHNICAL FIELD

The present disclosure relates to code changes and code review services and, more particularly, to integrating source code analysis tools with the code review services.

BACKGROUND

Software development is a process of writing and maintaining source code. In a broader sense, software development includes all that is involved between the conception of desired software and the final manifestation of that software, ideally in a planned and structured process. Thus, software development may include research, new development, prototyping, modification, reuse, re-engineering, maintenance, or any other activities that result in software products. For simple programs or for programs for personal use, following a planned and structured process is not essential. However, for programs that are relatively large or that are for commercial use, following well-known software development standards is critical.

Many companies employ a code review process to ensure that the number of software bugs and other issues are caught before release of software. "Code review" (or "peer review") is the systematic examination of computer source code. Code review is intended to find and fix mistakes overlooked in the initial development phase, improving both the overall quality of software and the developers' skills. Some software developers use specialized software tools, such as Review Board, that are designed for peer code review. Such code review tools allow people to collaboratively inspect and discuss code changes while storing the history of the code changes for future reference.

However, current code review tools are limited in that people involved in a software project do not know how a proposed code change will affect the overall project. For example, a code change might not fix an old error and, at the same time, introduce new errors. The submitter of the code change (or an individual affiliated with the corresponding project) will have to manually run the tools and tests necessary to see the effect of the code change.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 2A-2C are screenshots of example results based on a code review that a code review processor received from a code review service;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for integrating source code analysis tools with a code review tool. A user submits a code change to the code review tool and one or more code analysis tools are automatically initiated to analyze the changed code. Results of the code analysis tool(s) are automatically provided back to the code review tool. Additionally or alternatively, one or more tests are automatically run to test one or more executables that are based on the changed code. Results of the test(s) are automatically provided to the code review tool. In this way, an effect of a code change is automatically determined and available for review along with the code change. The results of any code analysis tools and/or tests may be posted synchronously or asynchronously with the corresponding code change.

System Overview

Figure 1:
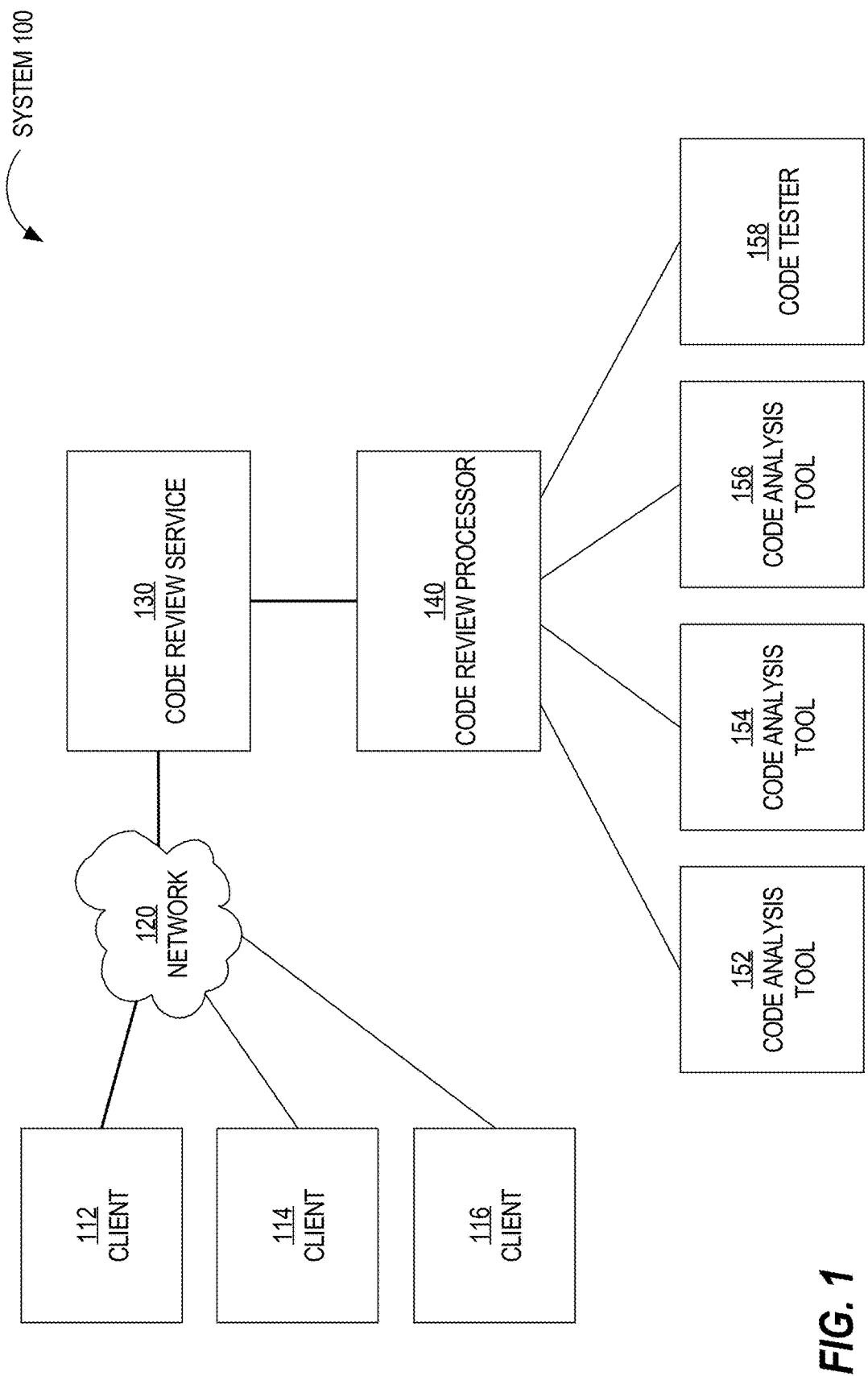
FIG. 1 is a block diagram that depicts a system where integrating code analysis tools are integrated with a code review service, in an embodiment.

FIG. 1 is a block diagram that depicts a system 100 for integrating code analysis tools with a code review service, in an embodiment. System 100 includes clients 112-116, network 120, code review service 130, code review processor 140, code analysis tools 152-156, and code tester 158.

Clients 112-116 may interact with code review service 130 directly or over network 120. Clients 112-116 are configured to send code change reviews to code review service 130. Examples of clients 112-116 include a desktop computer, a laptop computer, a tablet computer, and a smartphone. Although three clients 112-116 are depicted in FIG. 1, system 100 may include more or less clients.

Clients 112-116 may interact with code review service 130 using a web browser, such as Mozilla Firefox, Internet Explorer, and/or Google Chrome. Additionally or alternatively, clients 112-116 execute a dedicated application that is configured to communicate only with code review service 130.

Code Review Service

Code review service 130 receives code change reviews from clients 112-116. A code change review (or "code review" for brevity) includes (or corresponds to) multiple data items, such as a user identifier that identifies (e.g., uniquely) the user that submitted the code review, a code base identifier that identifies (e.g., uniquely) the code base to which the code review pertains, one or more file identifiers that identify the one or more source code files that were changed, a date and/or time of when the code review was submitted, and/or the actual changed code. The changed code may include just the changes (such as an added section of code, a deleted section of code) or a source code file that includes the changes. The changed code may not yet be committed to (or part of) the corresponding code base. A code base may include many source code files. Thus, a code review may correspond to a strict subset of the source code files (e.g., two files out of a total of twenty files) of the code base.

Code review service 130 provides an interface that makes code reviews available to any user that has access to code review service 130. For example, user A (operating client 112) submits a code review regarding code base A to code review service 130. Users B-C (operating clients 114-116) are able to view that code review when they "visit" (or otherwise interact with) code review service 130. Examples of code review services include Review Board, Gerrit, Phabricator, and Collaborator. These are examples of manual code review tools, which allow people to collaboratively inspect and discuss code changes, storing the history of the process for future reference. Code review service 130 may be a web-based tool or a client-based tool.

Code review service 130 may restrict which users can view which code reviews. For examples, if group A includes three developers that have worked on code base A, then any developers from group B (unless they are part of group A) are unable to view code reviews from developers of group A regarding code base A.

Code review service 130 may be hosted by the entity (e.g., a company) that employs or directs the work of the users operating clients 112-116. Alternatively, code review service 130 may be hosted by a third party, in which case clients 112-116 may need to provide user authentication information (e.g., username and password) in order to submit code reviews to code review service 130 and/or view code reviews (submitted by users of other clients 112-116) available at code review service 130.

While code review service 130 is depicted as a single entity, code review service 130 may be implemented on multiple computing devices, which may reside in the same LAN or subnet, or may reside in different networks that are geographically distributed.

Code Review Processor

Code review processor 140 is implemented in hardware, software, or any combination of hardware and software. Code review processor 140 receives code reviews from code review service 130. Code review processor 140 may communicate with code review service 130 through one or more API calls, such as GET REVIEW (where code review processor 140 requests code reviews) and POST RESULTS (where code review processor 140 sends results of quality analysis operations to code review service 130). Additionally or alternatively, code review service 130 may communicate with code review processor 140 through one or more API calls, such as POST REVIEW where code review service 130 sends a new code review (or batch of code reviews) to code review processor 140.

Code review processor 140 may receive code reviews in one of multiple ways. For example, code review processor 140 regularly polls (or requests code reviews from) code review service 130, such as every ten minutes. As another example, code review service 130 is configured to send, to code review processor 140, a code review upon receipt of the code review from one of clients 112-116. As another example, code review service 130 sends, to code review processor 140, a batch of one or more code reviews (that code review service 130 receives) every twenty minutes.

If code review processor 140 regularly polls code review service 130 for code reviews, then a request (from code review processor 140) for code reviews may indicate a timestamp or a code review identifier (ID) of the most recent code review that code review processor 140 received from code review service 130. Thus, code review service 130 may be configured to identify all the code reviews that have been received by code review service 130 after the timestamp or after the code review associated with the code review ID and send the identified code reviews to code review processor 140.

In an embodiment, code review service 130 and code review processor 140 are implemented on the same set of one or more computing devices. Alternatively, code review processor 140 and code review service 130 are implemented on different sets of computing devices. Thus, code review processor 140 may communicate with code review service 130 over a network, such as a LAN, WAN, or the Internet. Thus, code review processor 140 and code review service may communicate via one or more communication protocols, such as Remote Procedure Call (RPC) or HTTP.

Code review processor 140 receives multiple code reviews from code review service 130 and processes each code review individually or as a group of related code reviews. For example, a particular code review corresponds to code base A and code review processor 140 processes the code review independent of any other code reviews that code review processor 140 has received related to code base A. As another example, code review processor 140 receives two code reviews from code review service 130 and determines that both code reviews are associated with code base B. Code review processor 140 processes the two code reviews together and treats the set of two code reviews as a single code review.

In some cases, a code review may not involve a code change. For example, a code review may merely comment on a previous code change that has been proposed or committed. In an embodiment, code review processor 140 is configured to distinguish between code reviews that involve code changes and code reviews that do not. If code review processor 140 determines that a code review does not involve a code change, then the code review is discarded and may not be analyzed further.

Quality Analysis Operations

Code review processor 140 is configured to initiate, for a single code review or for a group of related code reviews, one or more quality analysis operations. Example quality analysis operations include a style checker, a static code checker, a cross-site scripting (XSS) checker, and a code or executable tester. The first three examples involve analyzing source code that has been changed while the last example involves testing a compiled version of the changed code.

In FIG. 1, code review processor 140 causes, for each code review, one or more code analysis tools 152-156 to analyze the source code that changed as indicated by the code review. While three code analysis tools 152-156 are depicted, system 100 may include more or less code analysis tools.

Initiating a code analysis tool may comprise code review processor 140 sending, to the code analysis tool, an instruction and source code identification data that identifies the source code that was changed. Alternatively, code review processor 140 sends the changed code to the code analysis tool. If source code comprises multiple source code files, then code review processor 140 may send only the changed source code file(s) to the code analysis tool. Alternatively, all the source code files are sent.

Examples of code analysis tools include a style tool, a static analyzer tool, and a XSS analyzer tool. A style analysis tool determines whether the analyzed source code adheres to one or more code writing practices, such as a limit to a number of characters per line, two blank lines between each function. A purpose of adhering to certain code writing practices is to allow future reviewers of the code to be able to easily interpret and understand the code's logic. Issues found as a result of running a style analysis tool can be used as a measure of software quality. The fewer the issues found, the higher the software quality.

A static analyzer tool is a tool that analyzes source code or object code without executing the object code. A static analyzer tool may analyze code at one or more levels, such as the unit level and technology level. Unit level analysis involves analyzing a subroutine or certain code within a specific program, without connecting to the context of that program. Technology level analysis involves analyzing interactions between programs to get a more holistic and semantic view of the overall program in order to find actual and potential issues, such as weak cryptography, SQL injection, integer overflow/underflow, buffer overflow, not de-allocating allocated memory, de-allocating memory that has not been allocated, etc.

An XSS analyzer tool is a tool that identifies encoding errors that can result in cross-site scripting (XSS) issues.

In an embodiment, code review processor 140 determines which quality analysis operations to perform relative to each code review or set of code reviews. For example, a code review may be for a specific type of source code file and each type of source code file is associated with a different set of code analysis tools. Thus, given a code review, the corresponding source code file is identified, a type of the source code file is determined, and a set of one or more quality analysis operations is identified based on the type. As a specific example, an XSS analyzer tool is called to analyze Dust templates or JavaServer Pages (JSP) templates but not other types of source code files.

Multiple Code Bases

In an embodiment, code review service 130 receives code reviews regarding multiple software projects, each corresponding to a different code base. A code base refers to a collection of source code that is used to build a particular software system, application, or software component.

In an embodiment, code review processor 140 is configured to poll for (or request) code reviews that are associated with a certain code base or a set of code bases. For example, a request to code review service 130 from code review processor 140 indicates a code base (or project) identifier and, based on the code base ID, code review service 130, identifies code reviews associated with that code base ID.

In an alternative embodiment, code review processor 140 processes code reviews associated with different code bases. In this embodiment, code review processor 140 stores definition data that associates each code base with one or more quality analysis operations. For example, code base A is associated with code analysis tools 152 and 156 and code tests 1 and 4 while code base B is associated with code analysis tools 154 and 156 and code tests 5-7. The definition data for a particular code base may be provided by a user that is familiar with the particular code base. Thus, different users may submit different definition data for different code bases.

Thus, when processing a code review, code review processor 140 identifies a code base associated with the code review (e.g., based on a code base ID included in the code review) and uses the definition data that corresponds to the code base to automatically determine which code analysis tools 152-156 to initiate (if any) and/or which code tests to run (if any).

Definition data may not only specify what code analysis tools and what tests to perform on a per-code base basis, but also on a source code file basis. Thus, definition data may (1) associate one source code file of a code base with a first set of one or more code analysis tools and (2) associate another source code file of the code base with a second set of one or more code analysis tools that is different than the first set.

Code Tester

Another example of a quality analysis operation is a test (e.g., a unit test) that tests an executable that is generated based on one or more source code files, at least one of which has been changed as indicated by a code review. Thus, additionally or alternatively to initiating one or more code analysis tools 152-156, code review processor 140 is configured to initiate one or more tests (using code tester 158) against one or more executables that are generated from the source code that was changed as indicated by the corresponding code review(s).

Although depicted as separate from code review processor 140, code tester 158 may be implemented on the same computer device(s) as code review processor 140 and, optionally, is integrated into the same program as code review processor 140. Alternatively, code tester 158 is implemented separately from code review processor 140 and is configured to receive a request (e.g., via an API call) from code review processor 140. A request may include data that identifies a code base that is affected by a code review, a group of source code files that has been changed by the code review, a particular source code file that has been changed by the code review, and/or the code review itself.

Code review processor 140 or code tester 158 compiles (or instructs another software component to compile) the source code (that includes the changes indicated by the code review) in order to generate one or more executables and then executes the one or more executables given the one or more tests associated with the code review. Code tester 158 (or another component) may determine which source code files were changed so that only those executables whose source files have been changed are compiled.

A test may be comprehensive in that the test involves testing all (or most) code of a software project, which may comprise many modules. An example of this type of testing is performance testing. Additionally or alternatively, individual software modules are combined and tested as a group, which is referred to as integration testing. Additionally or alternatively, a test may involve unit testing, which is a software testing method by which individual units of source code, sets of one or more computer program modules together with associated control data, usage procedures, and/or operating procedures are tested to determine whether they are fit for use. A unit may be the smallest testable part of an application. In procedural programming, a unit may be an entire module or an individual function or procedure. In object-oriented programming, a unit may be an entire interface, such as a class, or an individual method. Unit tests are short code fragments that may be created by programmers or occasionally by white box testers during the development process.

Results of Quality Analysis Operations

Each quality analysis operation produces a result. For example, each code analysis tool 152-156 generates a result, which may indicate a success, one or more errors, and/or one or more potential issues. As a specific example, code analysis tool 152 may generate a text file that lists all issues that are found. If no errors or issues are discovered, then the text file may be empty or may not be generated at all. If an error or potential issue is discovered, then the result may indicate where the error is found and/or how the error may be corrected or resolved. Different errors or potential issues may be of different types, which the result may indicate.

A result of a test may indicate that no errors or other issues were identified during the test or that an error or (potential) issue was discovered. If an error or issue is discovered, then the result may indicate a portion of the source code that corresponds to the error/issue.

A test result may also indicate code coverage data, such as a percentage of the code that was executed as part of the test, such as 52%. The greater the code coverage, the more reliable the test is, especially if no errors/issues were found during the test.

Code coverage data may indicate not only a percentage of the overall code that was executed during a test, but also a percentage of a source code file that was modified as part of the corresponding code review. If multiple source code files were modified, then code coverage data may include a percentage for each source code file. For example, if source code files A and C were modified, then code coverage data may indicate 48% for source code file A and 85% for source code file B.

Code coverage data may not only indicate the percentage of code that was executed during a test, but may also indicate the percentage of code that was executed during a previous test (of the same code base). For example, code coverage data may indicate 45% for a previous test and 56% for the current test.

In an embodiment, code review processor 140 is configured to send results of performing one or more quality analysis operations to code review service 130. Each result may indicate which quality analysis operation was performed to generate that result. For example, a result may indicate that a style analysis tool (and, e.g., which version) was used to generate the result. Each result may include data that identifies the code review that triggered the result, such as a code review ID. Each result may include data that identifies the code base to which the results correspond. For example, if a code review that initiated a test corresponds to code base A, then a result of the test identifies (or is modified by code review processor 140 to identify) code base A. Additionally or alternatively, a result that is sent to code review service 130 in response to processing a code review identifies the user that originally submitted the code review to code review service 130.

In an embodiment, code review processor 140 reformats a result into a format that code review service 130 recognizes. For example, if a test result is in plain text format and code review service 130 expects an XML format with certain element names, then code review processor 140 adds the appropriate XML element names and formats the test results accordingly.

In an embodiment, if multiple quality analysis operations are performed relative to source code of a code review (e.g., one or more code analysis tools 152-156 are executed and one or more tests are run), then code review processor 140 sends a single result to code review service 130 instead of multiple results. In this way, multiple results are consolidated into a single result or message.

Additionally or alternatively, code review processor 140 is configured to send results to code review service 130 when the results are available. Thus, for example, if first results of a static analysis tool are available before second results of a unit test, then the first results are sent to code review service 130 before (and separately from) the second results.

If multiple distinct messages (including results) are sent to code review service 130 regarding a single code review, then code review service 130 may be configured to group the messages (e.g., based on code review ID) and organize the messages such that the various results are displayed or organized together.

FIG. 2A is a screenshot of example results based on a code review that code review processor 140 received from code review service 130. The screenshot is of a page view generated by code review service 130 and displayed on a screen of client 112. The screenshot indicates that an XSS test, a style check, and static analysis were performed. The screenshot also indicates code coverage data of a source code file that was changed and of the entire software package. In this example, code tester 158 ran a test of a version of source code that does not include the code change indicated by the code review and ran a test of a version of the source code that includes the code change. In this example, the code coverage decreased with the code change.

The screenshot also includes two Uniform Resource Locators (URLs) that, when selected by a user, cause web pages to be generated that provide additional details about each code analysis tool that was used and each test that was run. Specifically, the first URL is a link to the unit test execution. The second URL is a link to the tool executions (e.g., code coverage, style check, XSS, etc.)

Code review processor 140 provides, to code review service 130, a summary of issues found (and their location) during processing a code review from code review service 130. The summary of issues are depicted in the screenshot of FIG. 2B. The screenshot is of an "Issue Summary" page that lists six issues that code review processor 140 discovered based on processing the code review. In this example, each issue is considered "open" and is not yet resolved. A user may select the "Status" button and select a different status, such as "Resolved" or "Dropped." If a different status is selected, then issues that are associated with that status will be displayed.

Furthermore, in this example, a style checker found each displayed issue. If a user selects one of the listed issues, then a different page view is displayed in place of (or in conjunction with) the current page view. An example of such a page view is depicted in FIG. 2C, which shows more information about each issue listed in FIG. 2B. For example, the first issue is that "MultiProductVersion" was imported by linkedin.utils.version but was unused. The second issue is that "color_my_string" was imported by linkedin.utils.text but was unused. Again, the information depicted in FIG. 2C is provided by code review processor 140.

Commiting Code Changes

In an embodiment, the processing of code reviews by code review processor 140 is performed relative to code changes that have not yet been committed.

In an embodiment, code review processor 140 causes the changes of a code review to be committed to the corresponding code base. For example, code review processor 140 either performs the commit operation or instructs another software component to perform the commit operation.

The decision to commit may take into account one or more factors, such as the extent of the changes (e.g., number of lines changed, number of lines added, number of lines deleted, certain (e.g., "critical" or "important" source code files have been changed) and the results of the quality analysis operations. For example, if no negative results are identified and the code coverage increased as a result of code change(s) associated with a code review, then the code changes are automatically committed. As another example, if a code change involved over five hundred lines of code being changed, then the code change is not committed, even if no errors or potential issues were identified.

Example Process

Figure 3:
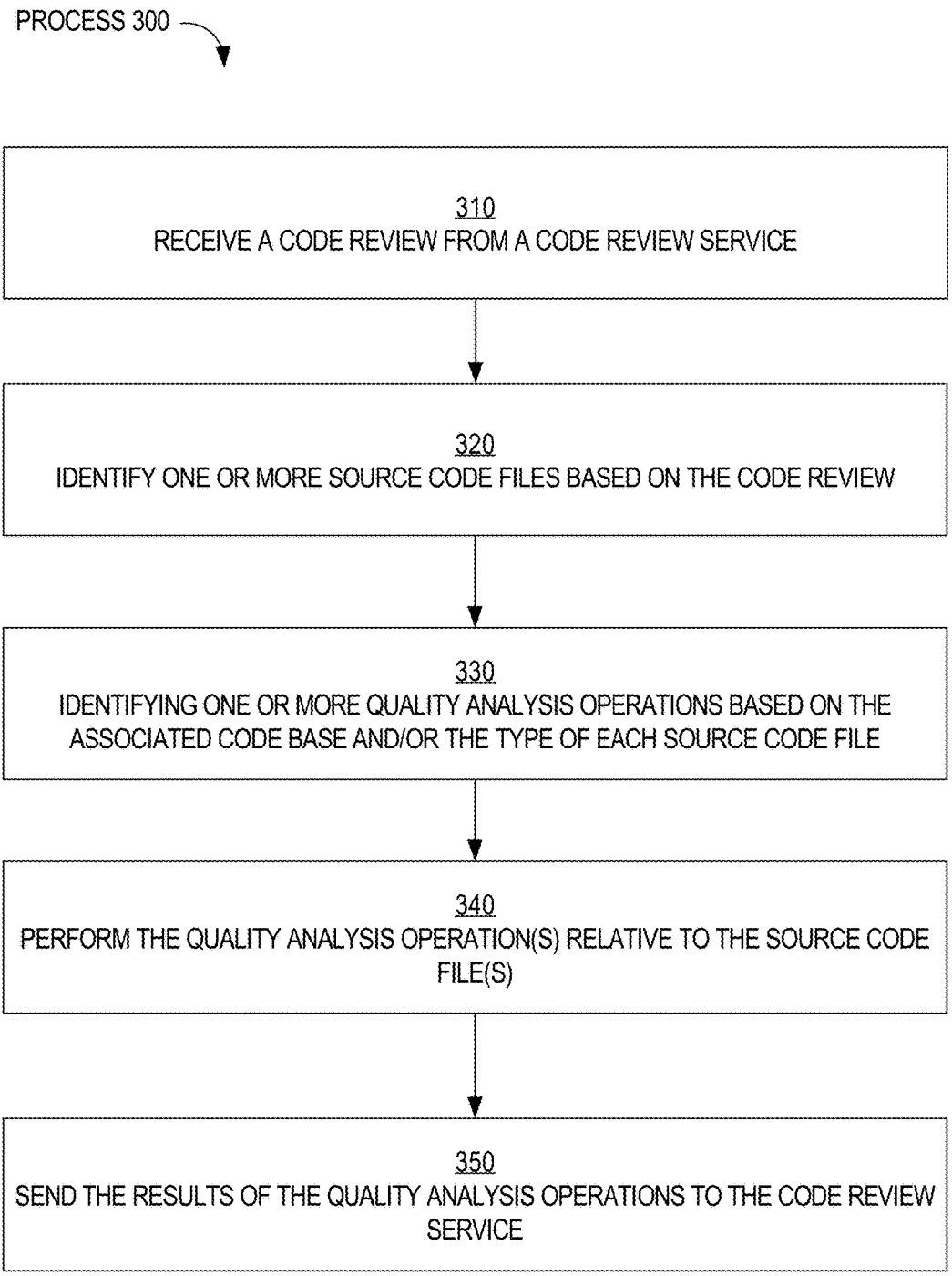
FIG. 3 is a flow diagram that depicts a process for analyzing code reviews, in an embodiment.

FIG. 3 is a flow diagram that depicts a process 300 for analyzing code reviews, in an embodiment. Process 300 may be performed by code review processor 140 and other components in FIG. 1.

At block 310, a code review is received from, for example, code review service 130.

At block 320, one or more source code files are identified based on the code review. For example, the code review may identify a source code file by name and include actual code changes.

At block 330, one or more quality analysis operations are identified based on the code base associated with the code review and/or the type of each source code file.

At block 340, the one or more quality analysis operations are performed relative to the one or more source code files to generate results.

At block 350, the results of the one or more quality analysis operations are sent to, for example, code review service 130. The results may include an identifier, such as a code review ID that is included in the original code review from code review service 130, to indicate with which code review the results are to be stored.

Example Code Review Processor

Figure 4:
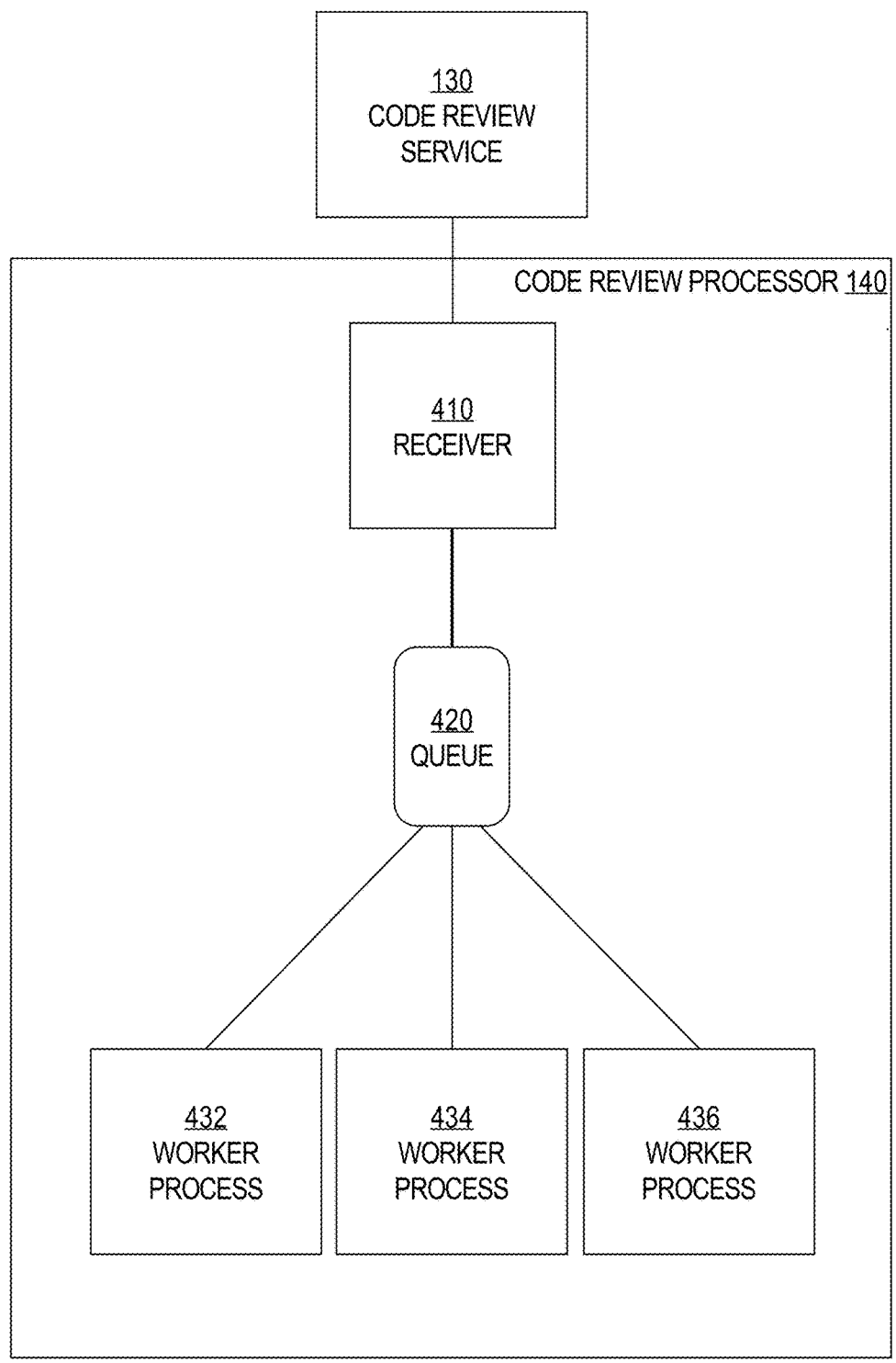
FIG. 4 is a block diagram that depicts example components of a code review processor, in an embodiment.

FIG. 4 is a block diagram that depicts components of code review processor 140, in an embodiment. In the depicted embodiment, code review processor 140 comprises a receiver 410, a queue 420, and worker processes 432-436, each of which may be implemented in software, hardware, or any combination of software and hardware. Although three worker processes are depicted, code review processor 140 may include more or less worker processes.

Receiver 410 is configured to receive code reviews from code review service 130 and place the code reviews in queue 420. Code reviews may be inserted into queue 420 according to a first-in first-out (FIFO) technique.

Each of worker processes 432-436 is configured to select a code review from queue 420 and process the code review. Selecting a code review may involve first requesting a lock on queue 420 to ensure that no two worker processes select the same code review. Once worker process 432 obtains a lock on queue 420, worker process 432 dequeues a code review from queue 420 and releases the lock so that other worker processes 434-436 may retrieve code reviews from queue 420.

In an embodiment, a worker process (e.g., worker process 442) identifies multiple code reviews that correspond to the same code base. For example, code review A comprises a change to source code file A of code base A and code review B comprises a change to source code file B of code base A. Based on determining that code reviews A and B correspond to the same code base, worker process 432 initiates code analysis tools 152-156 once for source code files A and B. In a related embodiment, code reviews are only treated as one if the code reviews involve changes to the same source code file. In a related embodiment, code reviews are only treated as one if the code reviews involve changes made by the same user to the same source code file or the same code base. Alternatively, code reviews are treated individually in all cases.

In an embodiment, each code review that one of worker processes 432-436 receives includes an identifier (or code review ID). Each of worker processes 432-436 may be configured to first check to determine whether a code review dequeued from queue 420 has already been processed by one of worker processes 432-436. Thus, each of worker processes 432-436 may have access to storage that stores a history of code reviews that have been previously processed by code review processor 140. The history of code reviews may include a list of code review IDs. Alternatively, receiver 410 is configured to perform this check before enqueing a code review to queue 420.

In an embodiment, in response to retrieving a code review (e.g., from queue 420), each of worker processes 432-436 is configured to retrieve code changes from code review service 130 or from an alternative source. In this way, potentially large code changes do not need to be handled by receiver 410 or stored in queue 420. A code change may comprise (e.g., solely) the changes that were made to a source code file and not the entire source code file. A worker process is configured to then construct a changed version the source code file based on the changes. For example, a code change may include ten new lines of code that begin at line 34 in a source code file. Worker process 432 that receives the corresponding code review of the code change retrieves (e.g., from code review service 130) the ten new lines of code, a line number (i.e., 34 in this example), and an identification of the source code file that is subject to the code change. Worker process 432 retrieves the source code file, identifies the line number in the source code file, and inserts the ten new lines of code at that line.

As another example, a code change may be deletion of seven lines of code that begin at line 91 in a source code file. Worker process 434 that receives the corresponding code review of the code change retrieves (e.g., from code review service 130) a line number of where the deletion starts (i.e., 91 in this example), a line number of where the deletion ends (i.e., 97 in this example), and an identification of the source code file that is subject to the code change. Worker process 434 retrieves the source code file, identifies the two line numbers in the source code file, and deletes the lines of code at and between those two line numbers.

Each of worker processes 432-436 is configured to then cause one or more quality analysis operations (as described herein) to be performed relative to the reconstructed source code files. In one embodiment, a worker process creates a separate computing job for each quality analysis operation that is performed relative to the corresponding code review. For example, one job is created for an XSS checker and another job is created for a style checker. Thus, the result of each job may be reported to code review service 130 when the result is available and does not have to "wait" for any other jobs (related to the same code review) that are still executing. Additionally or alternatively, a worker process creates a single computing job for multiple quality analysis operations.

In an embodiment, each of worker processes 432-436 is configured to create a job that, when executed, "cleans up" a workspace that is created to perform one or more quality analysis operations. The workspace may include one or more source code files associated with a code review and/or one or more executables that are generated based on the one or more source code files, including any output that is generated by the one or more executables. After a "clean up" job is executed, the workspace is cleared of any files associated with the code review.

Risk Score

In an embodiment, a result that code review processor 140 sends to code review service 130 includes a risk score that indicates a measure of risk associated with the code review. The measure of risk may indicate how risky it would be to commit or otherwise accept a code review. The measure of risk may be based on one or more criteria, such as the number of lines of code (or characters of code) that were canceled, the number of lines of code (or characters of code) that were added, the number of errors and potential issues that were identified as a result of performing one or more quality analysis operations, and the type of errors and potential issues that were identified. Each type of error and issue may be associated with a different score. For example, a style error is generally less worrisome than an error that indicates that an executable crashed during a test.

A risk score may be generated in any way. For example, each error and issue may be associated with a score, and each distinct code change within a code change is associated with a score (e.g., 3 for each added line, 2 for each modified line, 3 for each changed conditional, and 1 for each deleted line), and all the scores are summed to create a total score.

A risk score may simply be the total score. Alternatively, a total score may be mapped (e.g., by code review processor 140) to a distinct score range, examples of which include 0-25, 26-50, 51-75, and so forth. Each score range may be associated with a different color (e.g., green, yellow, or red) or a different risk rating (e.g., "High Risk", "Medium Risk", "Low Risk", and "No Risk"). A color and/or risk rating may be then provided to code review service 130.

In an embodiment, a risk score is associated with a code review ID so that code review service 130 (1) stores the risk score in association with the code review that initiated the code review and (2) causes the risk score to be displayed adjacent to results generated by performance of one or more quality analysis operations.

Identifying Reviewers of a Code Change

In an embodiment, one or more users (i.e., individuals) are identified as potential reviewers of a code change. The one or more users are identified based on code change history data that indicates which users have made changes to which code in the past.

For example, in response to determining that user A made changes to a source code file, an association between (1) user identification data that identifies user A and (2) code identification data that identifies the source code file is created. This "change association" is stored in the code change history data. Later, user B makes a change to the source code file or reviews the change made by user A. In response to detecting the change or the review by user B, the code change history data is analyzed to determine whether the source code file has been changed or reviewed by any other users. Because the code change history data indicates that user A has changed the source code file, then first user identification data that identifies user A is stored in association with second user identification data that identifies user B. This "change association" may be used in any number of ways.

For example, user B may be notified that user A should review user B's change. As another example, user A may be automatically notified (e.g., via email, IM, or native application on user A's registered personal device) about user B's change. As another example, a code review that indicates user B's change and that is submitted to a code review service (e.g., code review service 130) is automatically supplemented with data that identifies user A as a potential or recommended reviewer. As another example, a result of a code analysis tool or a test is supplemented with data that identifies user A as a potential or recommended reviewer.

The changes that initiate storage of change associations may or may not have been committed to their respective code base.

The granularity of a change association may vary from one implementation to another. In an embodiment, a change association merely indicates a user and a code base. Thus, a change to any part of a particular code base will trigger the identification of all (or multiple) users who submitted changes (e.g., whether committed or not) to any portion of the particular code base and/or all users who reviewed a code change associated with the particular code base.

Additionally or alternatively, a change association indicates a folder or group of source code files, which is a strict subset of the corresponding code base. Thus, the code base includes one or more other source code files that are outside that group. For example, a change to a source code file in a particular group of files will trigger an identification of all (or multiple) users who submitted changes (or reviewed such changes) to any file in the particular group. If a particular user submitted (or originated) a change to a file outside the particular group, but did not submit (or originate) any changes to any files in the particular group, then the particular user would not be identified as a potential or recommended reviewer.

Additionally or alternatively, a change association indicates a single source code file. Thus, a change to a particular source code file will trigger the identification of all (or multiple) users who submitted changes (or reviewed such changes) to that particular source code file.

Figure 5:
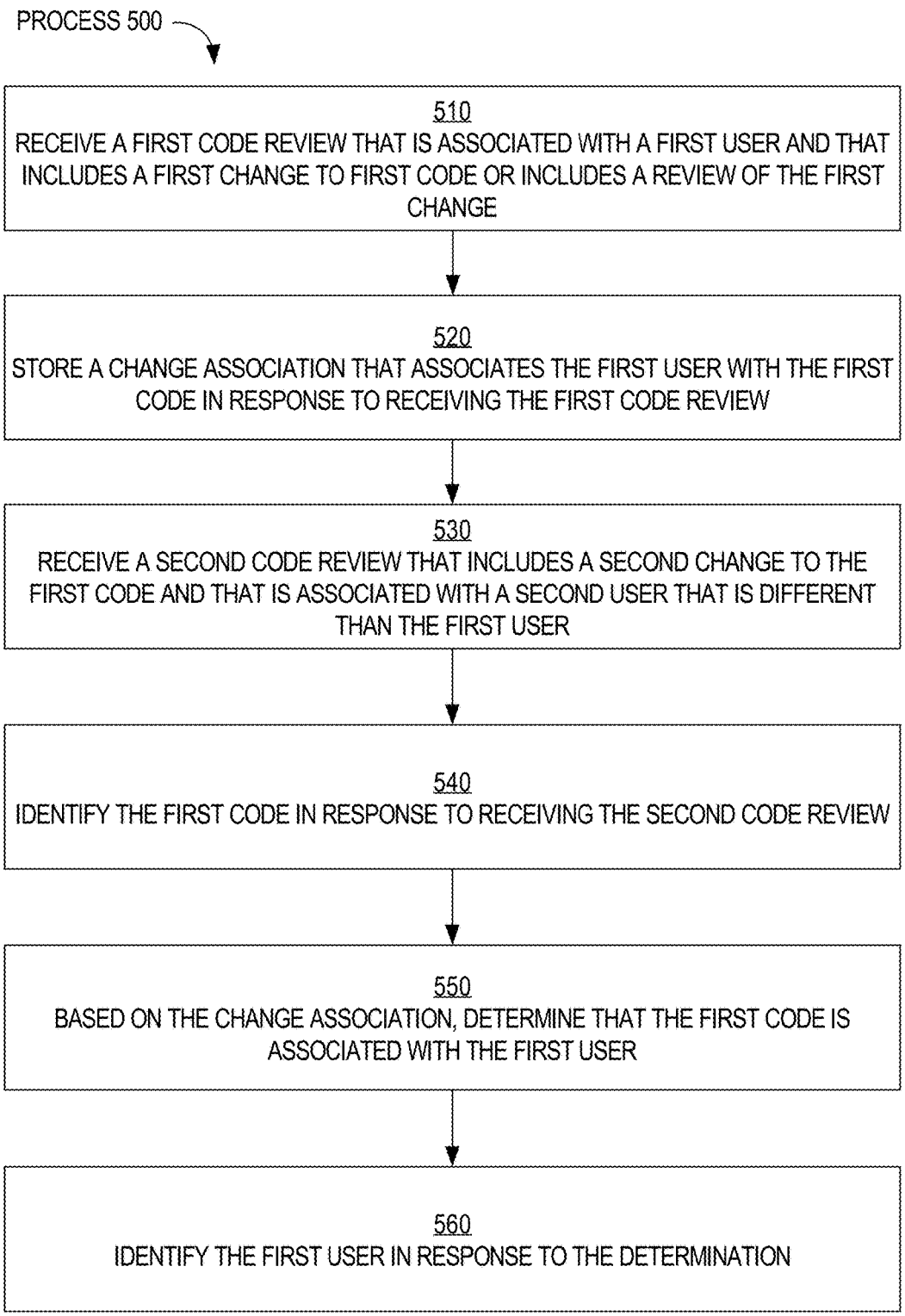
FIG. 5 is a flow diagram that depicts a process for identifying reviewers of a code change, in an embodiment.

FIG. 5 is a flow diagram that depicts a process 500 for identifying reviewers associated with a code change, in an embodiment. Process 500 may be performed by a code review service 130, code review processor 140, client 112, or another device or system not depicted in FIG. 1. Thus, code review processor 140 may not be involved at all.

At block 510, a first review that is associated with a first user and that includes a first change to first code or includes a review of the first change.

At block 520, in response to receiving the first review, a change association that associates the first user with the first code is generated and stored.

At block 530, a second review that includes a second change to the first code and that is associated with a second user that is different than the first user is received.

At block 540, in response to receiving the second review, the first code is identified.

At block 550, based on the change association, it is determined that the first code is associated with the first user.

At block 560, in response to this determination, the first user is identified. The first user may then be automatically notified about the second review or an identity of the first user is displayed to the second user (e.g., through code review service 130).

Complexity Score

In an embodiment, a complexity score is generated for a code review. A complexity score indicates how complex a code review is. The higher the complexity score of a code review, the more time the submitter of the code review will give to others to review the corresponding code change. In other words, the submitter of a "complex" code review should not expect others to review the code review so quickly. A reviewer may use the complexity score of a code review to estimate how much time to devote to studying or analyzing the code review.

A complexity score may be based on one or more criteria, such as number of lines that have changed, number of lines that have been added, number of lines that have been deleted, number of source code files that have changed, number of distinct groups of source code files that have changed, percentage of all source code files of a code base that have changed (e.g., 50%), change in code coverage, number of errors identified through testing and/or through code analysis tools.

Additionally or alternatively, a complexity score is based on a complexity of a code change graph that comprises nodes and edges. Each node represents a chunk (or set) of code and each edge represents an interaction between two chunks of code. For example, if code chunk A is modified, code chunk A interacts with (e.g., calls) code chunk B, and code chunk B interacts with code chunk C, then a code change graph would have three nodes (one for each of code chunk A, B, and C) and an edge between the first and second nodes and an edge between the second and third nodes. A complexity score for a code review may be based on the number of nodes in the corresponding code change graph and/or the number of edges in the code change graph. Other measures of complexity may be used, such as McCabe's Cyclomatic Complexity, Halstead Complexity, and Function Point counts.

A complexity score may be a number of a scale ranging from, for example, 0-100 or 0 to 1. Additionally or alternatively, a complexity score may comprise text, a graphic, an image, or any combination that reflects the complexity. For example, a green image may indicate low complexity while a red image may indicate high complexity. As another example, a light red image may indicate low complexity while a dark red image indicates high complexity. As another example, the letter A indicates low complexity while the letter Z indicates high complexity and letters in between indicate various complexities that rise as the letters approach the letter Z.

In an embodiment, an estimate of a time required for a human reviewer to review a current code review (that code review processor 140 processed) is calculated (e.g., by code review processor 140). The estimate may be based on historical information on similarly complex reviews. Thus, one or more previous code reviews are associated with complexity scores and an amount time spent on each of the previous code reviews. For example, if previous code reviews A and B had the same or similar complexity scores (e.g., within 10%) as current code review C and the average amount of time spent on previous code reviews A and B was three hours, then a time estimate for current code review C is also three hours.

Review Score

In an embodiment, a score is generated for (a) a reviewer of a code change/review and/or (b) the review provided by the reviewer. A person that submits a code change to code review service 130 may desire people associated with the corresponding code project to review the code change and provide substantive feedback. If a code change comprises changes to 10,000 lines of code and a reviewer provides a "Looks good" as the reviewer's only comment, then such a review is not likely to be helpful to the submitter of the code change, much less the code project overall. Thus, a review score is generated that reflects the helpfulness, usefulness, and/or comprehensiveness of a review of a code change.

One or more criteria may be used to calculate a review score for a review of a code change. Example criteria include the number of lines that changed as a result of the code change, a number of source code files that changed as a result of the code change (e.g., whether or not committed), a number of distinct comments in the review, a number of lines of text in the review, whether an issue is resolved or dropped, and correlation of automated analysis of issues with human mention of issues. For example, a ratio of (1) the number of words in a review of a code change and (2) the number of lines of code that changed as a result of the code change may be calculated and used as a review score for that review. Regarding the criterion of a correlation of automated analysis, a good reviewer will identify the same issues as an automated tool while a poor reviewer will miss those issues. Regarding the criterion of whether an issue is resolved or dropped, a good reviewer identifies issues that need to be fixed (resolved) while a poor reviewer identifies a relatively high number of false positives. Thus, a relatively high review score may have more resolved issues than dropped issues.

In an embodiment, multiple review scores that are associated with the same user/reviewer are used to calculate an overall reviewer score for that reviewer. For example, the lowest score and the highest score may be removed from the set of review scores associated with a particular reviewer. Then, the average review score is calculated from the remaining review scores in the set. The average review score becomes a reviewer score for that reviewer.

In an embodiment, a review score or a reviewer score is generated based on a correlation between (1) a human reviewer's identification of issues with a code change and (2) an automated identification of issues (e.g., by code review processor 140 and/or its affiliated components, such as code analysis tool 152) with the code change. A good reviewer will identify the same issues as one or more automated tools. A review/reviewer score may be simply a ratio of (1) a number of issues identified by the human reviewer relative to (2) a number of issues identified by an automated tool. Alternatively, some issues may be more critical or important than others. Therefore, some issues are weighted higher than other issues. Thus, if a reviewer identifies all critical issues but does not identify a significant number of relatively minor issues, then a score for the reviewer may still be relatively high.

In a related embodiment, generating a review/reviewer score based on the correlation described herein is performed by initiating code review processor 140 on previous code changes submitted by reviewers to code review service 130.

Thus, code review processor 140 is run after reviewers provide their reviews of a code change. For example, code review processor 140 identifies multiple issues based on a particular code change. The multiple issues are then compared to issues indicated in a code review submitted by a reviewer for the particular code change. If there is a significant overlap, then a score for the review/reviewer is relatively high. Conversely, if the code review only identified one or a few issues when code review processor 140 identified relatively many issues, then a score for the review/reviewer is relatively low.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
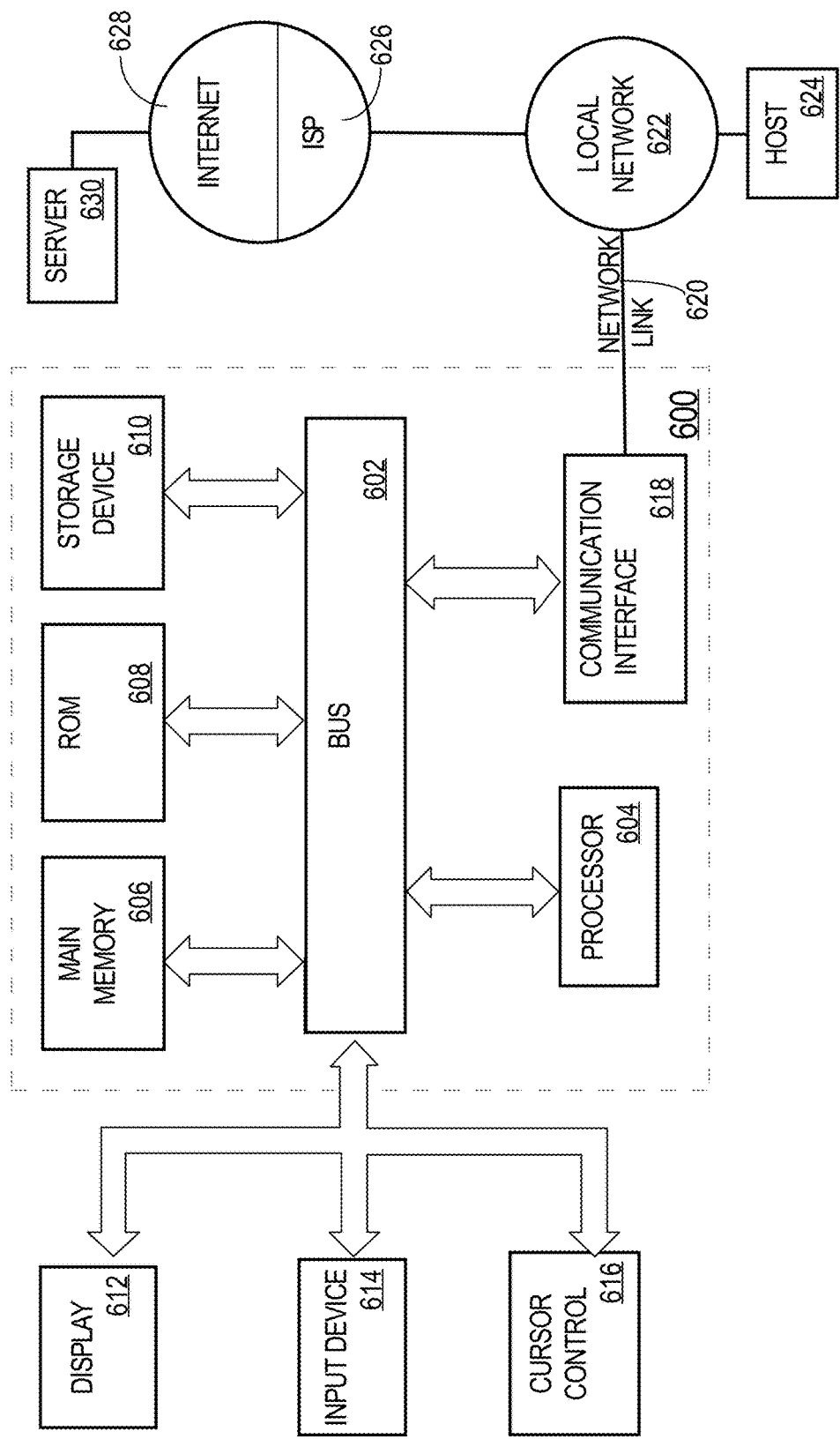
FIG. 6 is a block diagram that illustrates a computer system 600 upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving, from a code review service, a plurality of code reviews submitted by a plurality of users to the code review service;
    wherein each code review of the plurality of code reviews indicates a change to a set of code;
    for each code review of the plurality of code reviews:
        identifying the set of code that is associated with said each code review;
        causing one or more quality analysis operations to be performed relative to the set of code;
        identifying results of performance of the one or more quality analysis operations;
        providing the results to the code review service;
    wherein causing the one or more quality analysis operations to be performed comprises causing one or more tests to be run against a compiled version of the set of code;
    wherein identifying the results comprises identifying first results of running the one or more tests;
    wherein providing the results comprises providing the first results to the code review service;
    wherein the plurality of code reviews includes a particular code review that does not include a first set of code when the particular code review is received from the code review service;
    for the particular code review, prior to causing the one or more quality analysis operations to be performed relative to the first set of code that is associated with the particular code review:
        identifying source code identification data associated with the particular code review;
        using the source code identification data to retrieve the first set of code from storage;
        based on one or more changes indicated in the particular code review, modifying the first set of code to construct a first set of modified code against which the one or more quality analysis operations are performed;
    wherein the method is performed by one or more computing devices.

2. The method of claim 1, wherein:
    causing the one or more quality analysis operations to be performed comprises causing one or more code analysis tools to be executed against the set of code;
    identifying the results comprises identifying second results of executing the one or more code analysis tools;
    providing the results comprises providing the second results to the code review service.

3. The method of claim 2, wherein the one or more code analysis tools include one or more of a style checker, a static code checker, and a cross-site scripting error checker.

4. The method of claim 1, wherein, in response to receiving the results, the code review service makes the results available for review by one or more users of the code review service.

5. The method of claim 1, further comprising:
    sending, to the code review service, a request for code reviews;
    wherein receiving comprises receiving the plurality of code reviews in response to sending the request.

6. The method of claim 1, further comprising:
    for a first code review of the plurality of code reviews, based on first results that are associated with the first code review, generating a risk score that is associated with the first code review;
    providing the risk score to the code review service.

7. A computer-implemented method comprising:
    receiving a first review that pertains to first code and that is associated with a first user;
    in response to receiving the first review, storing code association data that associates the first user with the first code;
    receiving a second review that includes a first change to the first code and that is associated with a second user that is different than the first user;
    in response to receiving the second review:
        identifying the first code;
        based on the code association data, determining that the first code is associated with the first user;
        in response to determining that the first code is associated with the first user, generating, for the first user, a notification about the second review;
    performing a first analysis of one or more attributes of a user-provided review of a code change to a set of code;
    based on the first analysis, generating a score of the user-provided review;
    wherein the one or more attributes comprise a number of lines that changed as a result of the code change, a number of source code files that changed as a result of the code change, a number of distinct comments in the user-provided review, a number of lines of text in the user-provided review, whether an issue with the code change is resolved or dropped, or a correlation of automated analysis of the code change with one or more issues identified in the user-provided review;
generating a plurality of review scores, wherein each review score corresponds to a different code review of a plurality of code reviews, wherein each code review of the plurality of code reviews was provided by a particular user;
based on the plurality of review scores, generating a reviewer score for the particular user;
associating the reviewer score with the particular user;
wherein the method is performed by one or more computing devices.

8. The method of claim 7, further comprising:
performing a second analysis of one or more particular attributes of a third code review that is associated with changes to particular code;
based on the second analysis, generating a complexity score for the third code review;
associating the complexity score with the third code review;
wherein the one or more particular attributes comprise a number of lines of the particular code that have changed, a number of lines of the particular code that have been added, number of lines of the particular code that have been deleted, a number of source code files associated with the particular code that have changed, a number of distinct groups of the source code files associated with the particular code that have changed, a percentage of all source code files, of a code base, that have changed as a result of the third code review, a change in code coverage, or a number of errors associated with the particular code that have been identified through testing or through one or more code analysis tools.

9. The method of claim 7, further comprising:
receiving, from a code review service, a second plurality of code reviews;
storing the second plurality of code reviews in a queue;
identifying, by a first worker process of a plurality of worker processes, based on one or more criteria, a first set of code reviews from the queue;
identifying, by a second worker process of the plurality of worker processes, based on the one or more criteria, a second set of code reviews from the queue;
wherein the first set of code reviews is different than the second set of code reviews;
wherein the one or more criteria comprise code reviews from the same code base, code reviews associated with the same source code file, or code reviews associated with the same source code file and associated with the same user.

10. A system comprising:
one or more processors;
one or more storage media storing instructions which, when executed by the one or more processors, cause:
receiving, from a code review service, a plurality of code reviews submitted by a plurality of users to the code review service;
wherein each code review of the plurality of code reviews indicates a change to a set of code;
for each code review of the plurality of code reviews:
identifying the set of code that is associated with said each code review;
causing one or more quality analysis operations to be performed relative to the set of code;
identifying results of performance of the one or more quality analysis operations;
providing the results to the code review service;
wherein causing the one or more quality analysis operations to be performed comprises causing one or more tests to be run against a compiled version of the set of code;
wherein identifying the results comprises identifying first results of running the one or more tests;
wherein providing the results comprises providing the first results to the code review service;
receiving first tool data that identifies, for a first codebase, a first set of one or more quality analysis operations;
receiving second tool data that identifies, for a second codebase that is different than the first codebase, a second set of one or more quality analysis operations that is different than the first set of one or more quality analysis operations;
for a first code review of the plurality of code reviews:
determining that the first code review is associated with the first codebase;
in response to determining that the first code review is associated with the first codebase, using the first tool data to identify the first set of one or more quality analysis operations;
wherein causing the one or more quality analysis operations to be performed comprises causing the first set of one or more quality analysis operations to be performed relative to a first set of code that is associated with the first code review;
for a second code review of the plurality of code reviews:
determining that the second code review is associated with the second codebase;
in response to determining that the second code review is associated with the second codebase, using the second tool data to identify the second set of one or more quality analysis operations;
wherein causing the one or more quality analysis operations to be performed comprises causing the second set of one or more quality analysis operations to be performed relative to a second set of code that is associated with the second code review.

11. The system of claim 10, wherein:
causing the one or more quality analysis operations to be performed comprises causing one or more code analysis tools to be executed against the set of code;
identifying the results comprises identifying second results of executing the one or more code analysis tools;
providing the results comprises providing the second results to the code review service.

12. The system of claim 11, wherein the one or more code analysis tools include one or more of a style checker, a static code checker, and a cross-site scripting error checker.

13. The system of claim 10, wherein, in response to receiving the results, the code review service makes the results available for review by one or more users of the code review service.

14. The system of claim 10, wherein the instructions, when executed by the one or more processors, further cause:
sending, to the code review service, a request for code reviews;
wherein receiving comprises receiving the plurality of code reviews in response to sending the request.

15. The system of claim 10, wherein the instructions, when executed by the one or more processors, further cause:
for a particular code review of the plurality of code reviews, based on first results that are associated with the particular code review, generating a risk score that is associated with the particular code review;
providing the risk score to the code review service.

16. A system comprising:
one or more processors;
one or more storage media storing instructions which, when executed by the one or more processors, cause performance of the method recited in claim 1.

17. A system comprising:
one or more processors;
one or more storage media storing instructions which, when executed by the one or more processors, cause performance of the method recited in claim 2.

18. A system comprising:
one or more processors;
one or more storage media storing instructions which, when executed by the one or more processors, cause performance of the method recited in claim 3.

19. A system comprising:
one or more processors;
one or more storage media storing instructions which, when executed by the one or more processors, cause performance of the method recited in claim 4.

20. A system comprising:
one or more processors;
one or more storage media storing instructions which, when executed by the one or more processors, cause performance of the method recited in claim 7.

* * * * *